US011572670B2

(12) United States Patent
Schmuttermair et al.

(10) Patent No.: US 11,572,670 B2
(45) Date of Patent: Feb. 7, 2023

(54) HYDRAULIC CONTROL ARRANGEMENT FOR AN ARRANGEMENT OF MOBILE MACHINES, AND ARRANGEMENT OF MOBILE MACHINES

(71) Applicant: Robert Bosch GmbH, Stuttgart (DE)

(72) Inventors: Peter Schmuttermair, Gessertshausen (DE); Ulrich Lenzgeiger, Dinkelscherben (DE); Uwe Maier, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 493 days.

(21) Appl. No.: 16/405,544

(22) Filed: May 7, 2019

(65) Prior Publication Data

US 2019/0345694 A1     Nov. 14, 2019

(30) Foreign Application Priority Data

May 8, 2018   (DE) ...................... 10 2018 207 158.6

(51) Int. Cl.
| | |
|---|---|
| *E02F 9/20* | (2006.01) |
| *E02F 9/22* | (2006.01) |
| *F15B 11/16* | (2006.01) |
| *A01B 63/102* | (2006.01) |
| *F04B 49/12* | (2006.01) |

(52) U.S. Cl.
CPC .......... *E02F 9/2025* (2013.01); *A01B 63/102* (2013.01); *E02F 9/2221* (2013.01); *F04B 49/12* (2013.01); *F15B 11/165* (2013.01); *F15B 2211/253* (2013.01); *F15B 2211/605* (2013.01);
(Continued)

(58) Field of Classification Search
CPC .... E02F 9/2025; E02F 9/2221; A01B 63/102; A01B 63/10; F04B 49/12; F15B 11/165; F15B 2211/253; F15B 2211/605; F15B 2211/6309; F15B 2211/6313; F15B 2211/665
See application file for complete search history.

(56) References Cited

U.S. PATENT DOCUMENTS

| | | | | |
|---|---|---|---|---|
| 5,678,470 A | * | 10/1997 | Koehler | ............... E02F 3/431 60/327 |
| 2013/0000292 A1 | * | 1/2013 | Edler | .................. F15B 11/055 60/327 |
| 2013/0146318 A1 | * | 6/2013 | Bassett | ............... A01C 21/005 172/5 |

FOREIGN PATENT DOCUMENTS

| | | |
|---|---|---|
| DE | 29 00 866 A1 | 7/1980 |
| DE | 10 2005 059 240 A1 | 6/2007 |

(Continued)

OTHER PUBLICATIONS

Machine Translation of DE-102014103932-B3 (Year: 2015).*

*Primary Examiner* — Faris S Almatrahi
*Assistant Examiner* — Andrew J Cromer
(74) *Attorney, Agent, or Firm* — Maginot, Moore & Beck LLP (57) ABSTRACT

A control arrangement for an arrangement of hydraulically couplable machines has an interface for hydraulic coupling of the machines, and a hydraulic machine for supplying pressure medium to at least one hydraulic consumer of the machines in accordance with requirements. An electronic control device is configured, in accordance with a load of the consumer, to generate an electronic control signal, which can be converted by a transducer of the control arrangement into a hydraulic control signal, in accordance with which the hydraulic machine can be operated.

14 Claims, 3 Drawing Sheets

(52) U.S. Cl.
  CPC ........... *F15B 2211/6309* (2013.01); *F15B 2211/6313* (2013.01)

(56) References Cited

FOREIGN PATENT DOCUMENTS

| | | | |
|---|---|---|---|
| DE | 10 2014 103 932 B3 | 7/2015 | |
| DE | 102014103932 B3 * | 7/2015 | ............ F15B 11/055 |
| EP | 3 006 245 A1 | 4/2016 | |
| WO | 2011/107190 A1 | 9/2011 | |

\* cited by examiner

HYDRAULIC CONTROL ARRANGEMENT FOR AN ARRANGEMENT OF MOBILE MACHINES, AND ARRANGEMENT OF MOBILE MACHINES

This application claims priority under 35 U.S.C. § 119 to patent application no. DE 10 2018 207 158.6, filed on May 8, 2018 in Germany, the disclosure of which is incorporated herein by reference in its entirety.

The disclosure relates to a hydraulic control arrangement for an arrangement of mobile machines, and to an arrangement of mobile machines having the control arrangement.

BACKGROUND

An arrangement of mobile machines has at least two mobile machines. In general, one of these is a towing machine, e.g. a tractor, and another is a towed machine, e.g. a harvest wagon. Both machines have at least one hydraulic consumer, e.g. a hydraulic motor or a hydraulic cylinder, which needs to be supplied with pressure medium. For this purpose, a hydraulic pump or hydraulic pump unit is arranged on the machine designed as a towing machine and supplies the consumers of the towing machine. Via a hydraulic interface, which is also known as a "power beyond", it is also possible to supply the consumers of the towed machine.

In order to provide the pressure medium in accordance with requirements, that is to say, in particular, in a manner tailored to the load pressure of the consumers, arrangements of this kind are generally fitted with load sensing systems for the working hydraulics. In such systems, the highest of the load pressures of the various consumers is determined by means of a hydraulic selection device, e.g. a shuttle valve cascade, and indicated to the hydraulic pump. A pump controller then adjusts the pump pressure provided by the hydraulic pump in accordance with the highest load pressure to a value which is equal to the highest load pressure plus a differential pressure. This makes available the required pressure difference that enables the consumers to be supplied via control valves with sufficient pressure medium and to overcome the flow losses of the hydraulic lines.

In conventional practice, the differential pressure at the pump controller is set to a fixed value of between 20 and 40 bar. In this case, the level of the value set is affected by the line cross sections, the length thereof and the pressure medium volume flows appropriate to the purpose of the consumers since it is on these that the flow losses depend.

A fundamental document on the load-sensing control of a hydraulic pump for a hydrostatic drive system is German Laid-Open Application DE 10 2005 059 240 A1. In this document, the load pressure is detected electronically and indicated to an electronic control device. In this way, it is possible to avoid long hydraulic load-indicating lines to the controller of the hydraulic pump. These have the problem, for example, that the hydraulic load pressure signal indicated via said lines may be prone to oscillate owing to a slight but nevertheless present compressibility of the pressure medium and an elasticity of the lines. This makes it more difficult to indicate a load to the hydraulic pump in a manner which is reliable in terms of the process involved, and it can have a disadvantageous effect on the control behavior of the pump controller. These problems can be counteracted by the use of electronic load indication and processing. Moreover, electronic processing of the indicated load pressure enables said pressure to be modified or falsified in order to control the pump as desired.

The use of electronic load indication, further processing and modification of the originally hydraulic load pressure signal is shown by document DE 10 2014 103 932 B3. In this case, the towed machine has arranged on it a control device which electronically processes for a difference of the pump pressure and the highest load pressure of the consumers of said machine and indicates this difference electronically to a hydraulic pump controller. Hydraulic operation of a hydraulic adjusting element of the adjustable hydraulic pump is then performed in accordance with the electronic signal by means of the pump controller. In order to keep the hydraulic lines for load indication relatively short and to limit the abovementioned effect, electronic detection of the load pressure of the consumers of the towed machine is performed in the region of said machine in this case.

The disadvantage with this solution is that, when using various or several towed machines, the advantage of electronic processing of the load pressure signal is only available if each of the towed machines is fitted with a control device in this way. This represents a considerable outlay in terms of equipment and therefore there is an obstacle to equipping towed machines for electronic detection of the load pressure.

SUMMARY

Faced with this situation, it is the underlying object of the disclosure to provide a control arrangement for hydraulically couplable machines which allows a very wide variety of combinations of machines with only a low outlay in terms of equipment in the case of electronic load pressure detection. Another object is to provide an arrangement of hydraulically couplable machines which allows a very wide variety of combinations of machines with only a low outlay in terms of equipment in the case of electronic load pressure detection.

The first object is achieved by a control arrangement having the features disclosed herein, and the second is achieved by an arrangement of hydraulically couplable mobile machines having the features disclosed herein.

A hydraulic control arrangement for an arrangement of hydraulically couplable machines has an interface for the hydraulic coupling of the machines. This interface has, in particular, a pressure or feed port, a low-pressure or return port and a load-indicating port and is also known by the designation "power beyond". To supply pressure medium to the hydraulic consumer or consumers of the machines in accordance with requirements, the control arrangement has a hydraulic machine, in particular a hydraulic pump. This is preferably designed as a pump with an adjustable delivery volume. The control arrangement furthermore has an electronic control device, by means of which it is possible, in accordance with a load of the consumer, to generate an electronic control signal. The load is, in particular, a load pressure. In particular, the electronic control signal corresponds to a sum of the load pressure, in particular the highest load pressure, and a differential pressure stored as a constant or variable value in the control device. The electronic control signal can be converted by a transducer, in particular an electrohydraulic transducer, of the control arrangement into a hydraulic control signal, in accordance with which the hydraulic machine can be operated for the already mentioned purpose of supplying pressure medium in accordance with requirements. Preferably, the transducer can be operated or is operated by the control device, using the electronic control signal. According to the disclosure, the transducer and the hydraulic machine can be connected or are connected in such a way that they can be arranged on the same machine.

Even in the case of a large number of couplable machines, it is thus possible for the control device to evaluate electronic signals for the load or loads of the machines, and the electronic control signal has to be sent only to a central transducer connected to the hydraulic machine as specified by the disclosure. There is therefore no need to provide a transducer in a decentralized manner—on other machines that can be supplied by the hydraulic pump. There is thus an advantage in terms of equipment over the prior art in the case of a plurality of machines, with a smaller number of transducers.

In a development, the transducer and the hydraulic machine can be connected or are connected either on the near side or the far side of the interface.

A particularly compact arrangement and short and rigid hydraulic signal lines are made possible by a development in which the transducer and the hydraulic pump can be connected or are connected in a fixed manner, in particular in a manner fixed in relation to a housing.

The transducer offers the possibility of converting the electronic control signal back into a hydraulic control signal. In this way, the electronically detected load can advantageously be processed electronically by the control device and can, for example, be modified electronically in any desired manner. The electronic control signal which is output is converted back into a hydraulic control signal by the transducer and can then be made available once again to a hydraulic controller, in particular a conventional hydraulic controller, in particular a pump controller of the hydraulic pump. Existing units comprising a hydraulic pump and a hydraulically operated pump controller thus do not need to be converted, despite electronic load detection and processing. It is furthermore possible in this way, after re-conversion into the hydraulic control signal, for the hydraulic control signals, in particular load pressures, to be taken into account as well for pump control.

One measure for the load is preferably a load pressure. The electronic control signal can then preferably be determined by the control device proportionally to the sum of the load pressure and a differential pressure. As an alternative or in addition, the measure can be a hydraulic power, i.e. a product of the load pressure and the pressure medium volume flow. Other measures are also conceivable, e.g. a torque picked off at the consumer or the like.

The machine on which the hydraulic pump can be arranged or is arranged is preferably configured as a towing machine with a driving machine designed as an electric motor or an internal combustion engine, whereas the other one or ones is/are configured as a towed machine or machines.

In a development, the control arrangement has at least one means for electronic detection of a load of the consumers, in particular a pressure detection unit. These can have or do have a signal link to the control device. In this way, the load of the consumer or consumers, in particular a highest load of the loads, can be indicated to the control device for further processing.

In a development, the means and the control device can be connected or are connected in such a way that they can be arranged on the same machine, such as the hydraulic pump. As a result, the machine on which the hydraulic pump can be arranged can be coupled to any desired machines—these are usually towed machines. In this case, it is not necessary for the latter machines to be converted to electronic detection of the load; on the contrary, it is also possible for existing machines with purely hydraulic detection and transmission of the load or load pressure to be coupled without problems.

In a development, the transducer (56) is arranged in or on a pressure medium flow path of the control arrangement, which can be supplied or is supplied with a controllable or controlled pressure medium volume flow of a signal pressure medium, in particular a pressure medium volume flow which can be controlled or is controlled in a constant or quasi-constant manner. In this way, a high quality of the hydraulic control signal as a function of the electronic control signal is possible.

For this purpose, in a development of the control arrangement, a nozzle or orifice plate is arranged in the pressure medium flow path, in particular upstream of the transducer, making it possible to set a pressure medium volume flow in the pressure medium flow path in a manner which is simple in terms of equipment.

In order to be able to precisely control a pressure medium volume flow in the pressure medium flow path, a pressure medium volume flow controller is arranged in the pressure medium flow path, in particular upstream of the transducer.

In a development, in order to further increase the quality of the hydraulic control signal, a pressure chamber of the transducer, to which the hydraulic control signal is applied or at which it is output, can be connected or is connected in a restricted manner to a pressure medium sink. In this way, oscillations of the hydraulic control signal can be damped.

In a development, the transducer is configured as a pressure-reducing valve, a pressure control valve or a pressure-limiting valve. In this case, the valve can be operated, in particular is operated, by the electronic control signal of the control device and sets or controls the pressure of a signal pressure medium. The variant with a pressure-limiting valve as a transducer has proven particularly simple and advantageous in terms of equipment here.

In a development, the signal pressure medium is preferably provided in such a way that a hydraulic input of the transducer or valve can be connected, in particular is connected, in a fluidically restricted manner to a pressure medium source of the control arrangement. The arrangement is a particularly simple construction if the pressure medium source is a high pressure chamber of the hydraulic pump and the signal pressure medium for the control of the hydraulic pump can thus be provided by the pump itself.

In a development, a hydraulic output of the transducer or valve to which the hydraulic control signal or hydraulic control pressure is applied can be connected or is connected in a restricted manner to a pressure medium sink. This gives rise to a leakage oil flow which allows good control of the hydraulic control signal or hydraulic control pressure.

In order, in particular, to keep this leakage oil flow constant and thus ensure a high control quality of the hydraulic control signal, in particular the hydraulic control pressure, the arrangement has, in a development, a pressure medium volume flow controller in a pressure medium flow path from a signal pressure medium source to the transducer.

In a development, the arrangement has a pump controller, by means of which a controlled variable of the hydraulic pump, in particular a pressure, in particular the differential pressure, and/or a delivery flow volume is or can be controlled in accordance with the electronic control signal.

In this case, the pump controller can be configured in such a way that it can be operated by the electronic or the hydraulic control signal or by both types of control signal.

To prioritize and/or select one of several control signals, by means of which the pump controller can then ultimately be operated, the arrangement has, in a development, a signal selection device, to the inputs of which the electronic control signal or a control signal dependent thereon—in particular the converted hydraulic control signal—and some other control signal are applied.

In a development, the signal selection device is hydraulic and has hydraulic inputs. The converted hydraulic control signal and the other (hydraulic) control signal are applied to these inputs, for example. As a particularly simple option, it is configured as a pressure selection valve or shuttle valve and selects a highest of the pressures or load pressures applied to the inputs as a control signal.

This is advantageous particularly if the other control signal is that of a high-priority consumer, in particular a safety-relevant consumer, e.g. a steering system or brake. Thus, the load or load pressure of this particularly relevant consumer does not first have to be converted into an electronic signal and can be fed directly by hydraulic means into the control chain, which represents a gain in terms of safety. If the other (hydraulic) control signal is greater than the hydraulic control signal converted from the electronic control signal, reference may be made to a conventional LS mode or operation, in which a hydraulic load pressure signal is processed directly—i.e. without being converted electronically.

In a development, the pump controller and/or the signal selection device and/or the volume flow controller and/or the transducer are or is combined in a control block or a control disk. As an alternative or in addition, the transducer and the volume flow controller are integrated or combined into the pump controller.

In a development, the arrangement has one or more detection units for each consumer, in particular pressure detection units, for detecting the load, in particular the respective load pressure, of the consumers of the machines. In this case, the detection units have a wired or wireless signal link to the control device.

In a development, the pressure detection units can be configured as combined pressure and temperature detection units or sensors.

In a development, these are embodied with a SENT interface, thereby minimizing the outlay on cabling for the detection units and, on the other hand, offering the possibility of making the electronic control signal or control characteristics dependent thereon temperature-dependent. It is thereby possible to further increase the power and accuracy of open-loop and/or closed-loop control by means of the control arrangement, in particular by means of the control device.

In this development, the control device can be configured in such a way that a power of the hydraulic pump can be limited in accordance with one or more temperature limits stored in the control device.

In a development, the pressure detection units which convert the hydraulic pressure of the respective consumer into a load pressure signal that can be indicated to the control device can be arranged or are arranged in a distributed manner on the machines. In this case, conversion thus takes place close to the respective consumer, in particular on the respective valve control block of the machines. Indication to the control device can take place, for example, via an electronic interface between the machines, e.g. via an ISO bus.

As an alternative, all the pressure detection units or at least the majority thereof which convert the hydraulic pressure of the respective consumer into a load pressure signal that can be indicated to the control device can be arranged or are/is arranged on the machine on which the hydraulic pump and/or the control device can be arranged or are/is arranged. In this case, conversion of the hydraulic load pressure into the electronic load pressure signal thus takes place close to the control device.

In a development, the control device is configured in such a way that, by means of said device, the electronic control signal can be determined, in particular output, in accordance with an operating situation, in particular in accordance with the operating situation of one or more consumers.

For this purpose, the control device can have one or more configurations as alternatives to one another or as complementing one another. These are: configuration of the control device in such a way that the electronic control signal can be determined by means of said device with a fixed difference with respect to the highest load of the consumers (in particular to the highest load pressure), and/or configuration in such a way that the electronic control signal can be held constant by said device, and/or configuration in such a way that the electronic control signal can be limited by said device, in particular limited in a constant or variable manner.

As an alternative or in addition, the control device is configured in such a way that it is possible, by means of said device, to determine the electronic control signal with a variable difference with respect to the highest load of the consumers, in particular in accordance with a pressure medium volume flow and/or a line length and/or a pressure loss of the consumer concerned. If the electronic control signal corresponds to the sum of the highest load pressure and the added differential pressure, the differential pressure component can—as already mentioned—be stored as a constant value in the control device.

As an alternative, it can be stored as a variable value in the control device as a function of the pressure medium volume flow of the consumer presenting the highest load pressure or of the machine of said consumer.

The variably stored differential pressure preferably comprises a constant component of (generally) 8-10 bar, which is required as a constant pressure difference, set by the individual pressure balance of the consumer, at the feed orifice of the consumer. To this is added a variable component, which—as already mentioned—results from power losses dependent on the pressure medium volume flow.

A pressure medium volume flow of the hydraulic pump can be determined by means of the control device, preferably from a detected speed of the hydraulic pump and the delivery volume thereof detected, in particular, by means of a swivel angle detection unit.

A pressure medium volume flow of a respective consumer can be determined by the control device, preferably from a respective control signal of a feed orifice assigned to the consumer.

A pressure medium volume flow of a machine which can be coupled via the interface (power beyond) to the machine that has the hydraulic pump can be determined by means of the control device, preferably by means of a pressure medium volume flow balance, into which there enter the previously determined pressure medium volume flow of the hydraulic pump and—subtracted from the latter—the pressure medium volume flow of all the consumers on the near side of the interface.

According to a, wherein the control device is configured in such a way that it is possible, by means of said device, to determine load peaks and/or oscillations and to determine the electronic control signal in accordance therewith in such a way that the load peaks and/or oscillations therein can be at least partially compensated. The control of the hydraulic pump is then more stable, e.g. in respect of automatic oscillation reduction.

In a development, the electronic load pressure signals of individual consumers can be indicated to the operator by means of an active operator control element (human machine interface), e.g. a joystick with force feedback. The operator can thus "feel" the load.

An arrangement according to the disclosure has at least two hydraulically couplable machines having at least one hydraulic consumer and having a hydraulic control arrangement which is configured in accordance with at least one aspect of the above description. In this case, the machines are coupled hydraulically via the interface (power beyond), and the at least one consumer can be supplied with pressure medium in accordance with requirements by means of a hydraulic machine controlled by the control device as described above.

The hydraulic pump is preferably arranged on the machine which is designed as a towing machine and preferably has a driving machine.

Two illustrative embodiments of an arrangement according to the disclosure of mobile machines are illustrated in the drawings. The disclosure is now explained in greater detail by means of the figures of these drawings.

DETAILED DESCRIPTION

Figure 1:
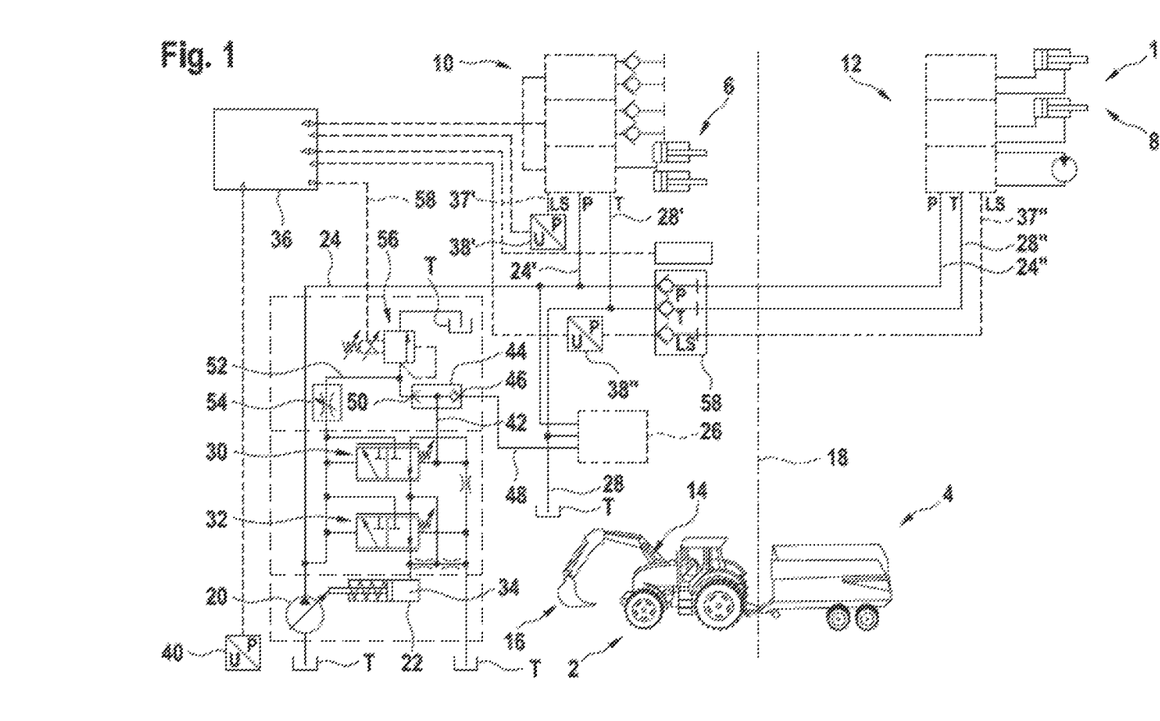
FIG. 1 shows a hydraulic circuit diagram of an arrangement of mobile machines in accordance with a first illustrative embodiment.

According to FIG. 1, a first illustrative embodiment of an arrangement of mobile machines 1 has a mobile machine 2 designed as a towing machine, e.g. a tractor, and a second mobile machine 4 hydraulically coupled thereto via an interface 58 referred to as a "power beyond". This second machine is configured as a harvest wagon. Both machines 2, 4 have a multiplicity of hydraulic consumers 6, 8. The consumers 6 and 8, respectively, can be supplied with pressure medium for the respective machine 2 and 4 via a valve control block 10 and 12, respectively, each of which has a multiplicity of control valves. Here, each of the consumers is assigned at least one control valve for pressure medium supply independent of the load pressure. This supply independent of the load pressure is ensured in a known manner by means of a combination of a feed orifice and an individual pressure balance (neither of which is illustrated) for each of the consumers 6 and 8, respectively. A typical consumer of the towing machine 2 is a lifting or hydraulic cylinder 14, for example, by means of which a shovel 16 can be lifted. A system boundary between the machines 2, 4 can be symbolized in the figures by means of the chain-dotted line 18.

To supply the consumers 6, 8 with pressure medium, the arrangement of mobile machines 1 has a hydraulic pump 20 with a variable displacement volume. The hydraulic pump 20 is configured as an axial piston machine of oblique-axis or swashplate construction, for example. To adjust the displacement volume, the hydraulic pump 20 has an adjusting device in the form of a hydraulic cylinder 22. This cylinder controls an adjusting element of the hydraulic pump 20, on which the delivery volume of said pump depends, in a known manner. In the case of design as a swashplate machine, this is a swivelable swashplate (not illustrated), for example.

In the illustrative embodiment shown, the hydraulic machine 20 is operated in an open hydraulic circuit and has a suction port, which is in pressure medium connection with a tank T. It has a pressure port, to which a working line 24 is connected. The valve control blocks 10, 12 and a steering system 26 are connected fluidically to the working line 24. The arrangement 1 furthermore has a return line 28, which is connected to the tank T. The return line 28, in turn, is also connected to the valve control blocks 10, 12 and to the steering system 26. Via the working line 24, the hydraulic pump 20 delivers pressure medium via the control valves of the valve control blocks 10, 12 to the consumers 6, 8 and to the steering system 26 in accordance with requirements, wherein a pressure medium volume return flow is discharged via the return line 28 to the tank T.

To make available the pressure medium in accordance with requirements, that is to say, in particular, to make available a pump pressure in the working line 24 which is sufficiently higher than the highest load pressure of the consumers, the hydraulic pump 20 has a pump controller 30 designed as a pressure controller. In interaction with feed orifices, adjustable by the operator, of the consumers 6, 8 and with individual pressure balances assigned to the feed orifices, this allows control of the delivery flow of the hydraulic pump 20 and is therefore also often referred to as a delivery flow controller 30.

Figure 2:
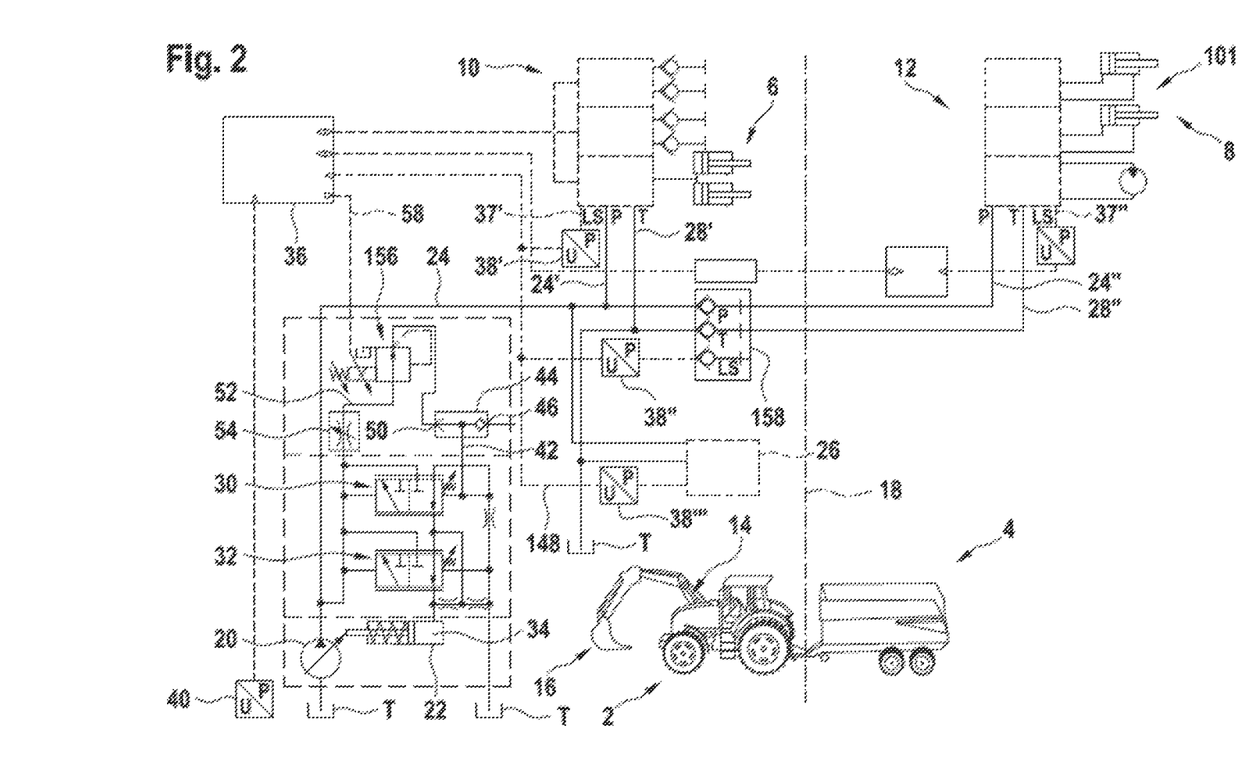
FIG. 2 shows a hydraulic circuit diagram of an arrangement of mobile machines in accordance with a second illustrative embodiment.

In the illustrative embodiments shown, the pump controller 30 is configured as a 3/2-way valve that can be operated in a proportional manner.

To cut off the pressure, i.e. for the controlled pressure limitation of the pump pressure, the hydraulic pump 20 has a pressure controller 32, which, in the illustrative embodiments shown, is configured as a 3/2-way valve that can be operated in a proportional manner. In this case, the delivery flow controller 30 and the pressure controller 32 are combined in one valve block.

As regards a pressure medium connection of a pressure chamber 34 of the hydraulic cylinder 22 to the working line 24, which leads to "swiveling back" or to the reduction of the delivery volume of the hydraulic pump 20, and as regards a pressure medium connection of the pressure chamber 34 to the tank T, which leads to "swiveling out" or to the enlargement of the delivery volume of the hydraulic pump 20, the pressure controller 32 is arranged downstream of the delivery flow controller 30 and thus always has the higher priority of the two valves 30, 32. In normal operation below a "cutoff pressure", the delivery flow controller 30 controls the pressure in the working line 24, while the pressure controller 32, which is also referred to as a pressure cutoff valve, is permanently in its open position, in which the pressure chamber 34 can be connected to the tank T. Only when the pump pressure exceeds the value of the "cutoff pressure" preset at the pressure controller 32 does the pressure controller 32 close the pressure medium connection of the pressure chamber 34 to the tank T and open the pressure medium connection to the working line 24, as a result of which pressure medium enters the pressure chamber 34 at high pressure and swivels the hydraulic pump 20 back. This form of pressure control by means of the delivery flow controller 30 and pressure cutoff by means of the pressure controller 32 is known per se from the prior art and is therefore not described further at this point.

As part of pressure medium supply in accordance with or oriented toward requirements, the arrangement of mobile machines 1 is equipped with a load-sensing system for the hydraulic consumers 6, 8. In a system of this kind, the highest load pressure of the various consumers 6, 8 is indicated to the hydraulic pump 20 by means of a hydraulic shuttle valve chain or shuttle valve cascade (not illustrated and contained in the individual valve control blocks 10, 12). Here, this indication is not given directly to the hydraulic pump 20 but takes place via an electronic control device 36. For this purpose, a load-indicating line 37' and 37" is connected to an electronic pressure detection unit 38' and 38", respectively, at the valve control block 10 and 12, respectively, said unit, in turn, having a signal link to the control device 36. The control device 36 furthermore has a signal link to a swivel angle detection unit 40, by means of which the swivel angle of the hydraulic pump 20 can be detected.

As already mentioned, the core element of the control of the pump pressure in the working line 24 is the delivery flow controller 30. By means of said controller, it is possible, on the one hand, for the working line 24 and, on the other hand, for the tank T to be connected fluidically to the pressure chamber 34. The pressure in the working line 24 acts on a valve body of the delivery flow controller 30 in the direction of the connection of the working line 24 to the pressure chamber 34. An adjustable spring and a hydraulic control signal present in a load-indicating line 42 act in the opposite direction, that of the connection of the tank T to the pressure chamber 34.

The load-indicating line 42 is connected to an output of a pressure selection or shuttle valve 44. This has two inputs 46, 50, of which a first 46 is pressure-medium-connected to the steering system 26 by a load-indicating line 48. A second 50 of the inputs 46, 50 is connected to a pressure line 52, which, in turn, is connected to the working line 24 via a pressure medium volume flow controller 54. A pressure-limiting valve 56 is connected to the pressure line 52. Via said valve, the pressure line 52 can be pressure-medium-connected to the tank T when the closing pressure at the pressure-limiting valve 56 is exceeded in the pressure line 52. The closing pressure of the pressure-limiting valve 56 can be set by means of the control device 36 by way of an electromagnet and a signal line 58.

During the operation of the arrangement 1, each of the consumers 6, 8 has a load pressure depending on the loading or load thereof. By means of the shuttle valve cascades of the valve control blocks 10, 12, the respectively highest load pressure is determined at said blocks and is picked off hydraulically by means of the signal line 37' and 37", respectively. By means of the pressure detection units 38' and 38", these hydraulic load pressure signals are each converted into an electronic signal and indicated to the control device 36. Here, a selection of the highest of the electronic load pressure signals and addition of a constant or a variable differential pressure Δp dependent on the operating conditions are then performed. A corresponding electronic control signal is sent via the signal line 58 to the electromagnet of the pressure-limiting valve 56. This limits the pressure in the pressure line 52, wherein a continuous pressure medium volume flow is diverted into said pressure line from the working line 24 via the volume flow controller 54. In this way, the transducer, which is designed as a pressure-limiting valve 56, can convert the electronic control signal of the control device (back) into a hydraulic signal. This signal is available as a pressure in the pressure line 52 at the second input 50 of the shuttle valve 44. The load pressure of the steering system 26 is available at the first input 46 as the other hydraulic control signal. The higher of the two pressures is output to the load-indicating line 42 and hence to the pump controller 30. In principle, this controller sets the differential pressure at which the pump pressure is available in the working line 24 above the pressure indicated in the load-indicating line 42.

The pressure-limiting valve 56 is combined as a structural unit with the hydraulic pump 20 and the valves 30, 32. It is thus arranged on the same side as the towing machine 2, on the near side of the power beyond interface 58.

The electronic control signal can be determined in such a way, for example, that control by means of the hydraulic pump 20 proves to be stable with respect to load pressure oscillations.

FIG. 2 shows a second illustrative embodiment of an arrangement of mobile machines 101, which corresponds to a large extent to that shown in FIG. 1. Components which are unchanged relative to the first illustrative embodiment therefore have unchanged at reference signs. However, the arrangement of mobile machines 101 differs in the following points from the first illustrative embodiment: on the one hand, a transducer 156 configured as a pressure control valve is instead provided as a pressure-limiting valve. Thus, it is the pressure medium volume flow of the pressure medium volume flow controller 54 which flows through the transducer 156. In comparison, the solution with a pressure-limiting valve as shown in FIG. 1 is less complex in terms of equipment. Another difference is the fact that the load indication from the consumers of the valve control block 12 of the second machine 4 does not take place via the power beyond interface 158 but via an electronic interface by means of an ISO bus. For this purpose, the pressure detection unit 38" is not connected to the LS port of the power beyond interface 158 but to a separate control device, which, in turn, is connected to the ISO bus. Said bus indicates the electronic load pressure signal of the control block 12 to the control device 36 for further processing as already described.

In the illustrative embodiment shown in FIG. 2, the load pressure of the steering system 26 is furthermore not detected and transmitted hydraulically but by an electronic pressure detection unit 38'''. Transmission takes place via an electronic signal line 148 to the control device 36. In corresponding fashion, prioritization of the load pressures indicated by the pressure detection units 38', 38" and 38''' takes place in the control device 36, i.e. electronically. Accordingly, the first input 46 of the shuttle valve 44 is also closed or "blind".

Figure 3:
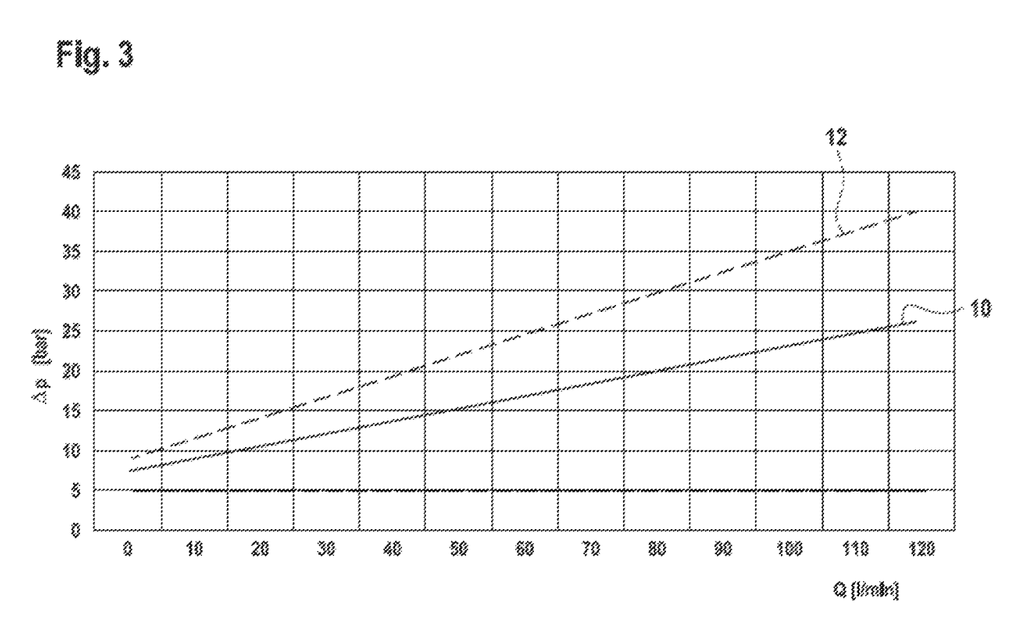
FIG. 3 shows a diagram of the differential pressure of a hydraulic pump of the arrangement as a function of the pressure medium volume flow, applying to both illustrative embodiments.

FIG. 3 shows a diagram illustrating the value of the electronic signal Δp which is sent by the control device 36 to the transducer 56; 156 and the dependence of said signal on the pressure medium volume flow Q of the hydraulic pump 20. Three curves are illustrated. A lower curve at a constant pressure of about 5 bar, which represents the minimum differential pressure that must be made available by the hydraulic pump 20 above the highest load pressure to be able to overcome the pressure loss at the valve control block 10 or 12. This minimum differential pressure is decisively determined by the pressure drop, which is to be held constant by means of the respective feed orifice and which is set by the respective individual pressure balances. In general, it is 8 to 10 bar but, in FIG. 3, is defined as 5 bar.

The two upper curves each represent variable values for the proportions accounted for by the pressure loss of the consumers 6 of the towing machine 2 and of the consumers 8 of the machine 4 on the far side of the power beyond interface 58; 158. It can be seen that, as the pressure medium volume flow Q rises, the values thereof increase continuously. This can be explained by the fact that, as the pressure medium volume flow Q becomes larger, power losses and hence pressure losses in the lines leading to the consumers 6, 8 also increase. The Δp to be controlled at the pressure controller 30 must be correspondingly higher. The characteristic illustrated in FIG. 3 is stored in the control device 36 for determining the electronic control signal Δp as a function of the pressure medium volume flows of the consumers 6, 8.

The disclosure relates to a control arrangement for hydraulically couplable machines, having a hydraulic pump controlled in a load-dependent manner, wherein a hydraulic load signal of a consumer of the machines can be converted by means of a load detection unit into an electronic load signal and can be modified by an electronic control device of the control arrangement into an electronic control signal, in accordance with which the hydraulic pump can be operated. In this arrangement, an electrohydraulic transducer of the control arrangement, which can convert this electronic control signal back into a hydraulic signal, is connected to the hydraulic pump in such a way that both are provided for arrangement on only one of the machines.

Also disclosed is an arrangement of mobile machines having a control arrangement of this kind.

What is claimed is:

1. A hydraulic control arrangement for an arrangement of hydraulically couplable mobile machines, comprising:
    an interface at which the hydraulically couplable mobile machines are selectively coupled to one another;
    a hydraulic pump configured to supply pressure medium to at least one hydraulic consumer of the hydraulically couplable mobile machines;
    an electronic control device configured to generate an electronic control signal based on a load of the at least one hydraulic consumer; and
    an electrohydraulic transducer configured to convert the electronic control signal into a hydraulic control signal, the electrohydraulic transducer and the hydraulic pump being connected to one another such that the hydraulic pump is operated based on the hydraulic control signal,
    wherein the electrohydraulic transducer and the hydraulic pump are both arranged on a first side of the interface and on a first one of the hydraulically couplable mobile machines.

2. The control arrangement according to claim 1, wherein the electrohydraulic transducer and the hydraulic pump are fixedly connected to one another.

3. The control arrangement according to claim 1, wherein the electronic control device is configured to operate the electrohydraulic transducer based on the electronic control signal.

4. The control arrangement according to claim 1, wherein the electrohydraulic transducer is arranged in or on a pressure medium flow path, which is supplied with a controllable pressure medium volume flow of a signal pressure medium.

5. The control arrangement according to claim 4, further comprising:
    a nozzle, an orifice plate, or a pressure medium volume flow controller arranged in the pressure medium flow path upstream of the electrohydraulic transducer.

6. The control arrangement according to claim 5, further comprising:
    a signal selection device including at least one input,
    wherein the hydraulic control signal and a further hydraulic control signal are applied to the at least one input,
    wherein the signal selection device is configured to enable one of the hydraulic control signal and the further hydraulic control signal to be selected and to supply the selected signal to a delivery flow controller.

7. The control arrangement according to claim 6, wherein the further hydraulic control signal is from a high-priority consumer.

8. The control arrangement according to claim 6, wherein the electrohydraulic transducer and/or the pressure medium volume flow controller and/or the delivery flow controller and/or the signal selection device are or is combined in a control block or a control disk or in a control block or control disk arrangement.

9. The control arrangement according to claim 1, wherein the electrohydraulic transducer includes a pressure-reducing valve, a pressure control valve, or a pressure-limiting valve.

10. The control arrangement according to claim 1, further comprising:
    a pump controller configured to control a controlled variable of the hydraulic pump based on the hydraulic control signal.

11. The control arrangement according to claim 1, wherein:
    the electronic control device is configured to determine the electronic control signal with a fixed difference with respect to a highest load of the consumers, and/or
    the electronic control device is configured to determine the electronic control signal with a variable difference with respect to the highest load of the consumers, and/or
    the electronic control device is configured to hold constant the electronic control signal, and/or
    the electronic control device is configured to limit the electronic control signal.

12. The control arrangement according to claim 1, wherein:
    the electronic control device is configured to detect load oscillations, and
    the electronic control device is configured to generate the electronic control signal to at least partially compensate for the load oscillations.

13. An arrangement of hydraulically couplable mobile machines, comprising:
    a first mobile machine;
    a second mobile machine; and
    a hydraulic control arrangement comprising:
        an interface at which the first and second mobile machines are selectively connected to one another;
        a hydraulic pump configured to supply pressure medium to at least one hydraulic consumer of the first or the second mobile machines;
        an electronic control device configured to generate an electronic control signal based on a load of the at least one hydraulic consumer; and
        an electrohydraulic transducer configured to convert the electronic control signal into a hydraulic control signal, the electrohydraulic transducer and the hydraulic pump being connected to one another such that the hydraulic pump is operated based on the hydraulic control signal,
    wherein the electrohydraulic transducer and the hydraulic pump are both arranged on a first side of the interface and on the first mobile machine.

14. The arrangement according to claim 13, wherein the first mobile machine is a towing machine having a driving machine.

\* \* \* \* \*